United States Patent [19]
Lee et al.

[11] Patent Number: 5,300,233
[45] Date of Patent: Apr. 5, 1994

[54] PROCESS OF DISPLACEMENT WASHING IN A CENTRIFUGE FILTER

[75] Inventors: Chie-Ying Lee, Milford; Win-Chin Chiang, Orange, both of Conn.

[73] Assignee: Dorr-Oliver Incorporated, Milford, Conn.

[21] Appl. No.: 15,018

[22] Filed: Feb. 9, 1993

[51] Int. Cl.$^5$ .................... B01D 33/11; B01D 33/60
[52] U.S. Cl. .................... 210/772; 210/781; 210/784
[58] Field of Search .................... 210/360.1, 365, 378, 210/404, 768, 777, 784, 787, 791, 781, 772

[56] References Cited

U.S. PATENT DOCUMENTS

| | | |
|---|---|---|
| 4,052,303 | 10/1977 | Hultsch et al. ............... 210/373 |
| 4,266,413 | 5/1981 | Yli-Vakkuri ............... 210/404 |
| 5,066,271 | 11/1991 | Krettek et al. ............... 494/58 |
| 5,091,084 | 2/1992 | Krettek ............... 210/232 |
| 5,194,146 | 3/1993 | Krettek ............... 210/119 |
| 5,227,075 | 7/1993 | Ostman ............... 210/784 |

FOREIGN PATENT DOCUMENTS 398173 11/1990 European Pat. Off. .
4101498 7/1992 Fed. Rep. of Germany .

OTHER PUBLICATIONS

"The Merco Centrifuge" Dorr–Oliver Bulletin No. 2630 (1991) contrasting dilution and displacement washing.

Krupp Buckau brochure 58/3/0401, "Peeler Centrifuge-Buckau Wolf System", date unknown.

*Primary Examiner*—Matthew O. Savage
*Attorney, Agent, or Firm*—DeLio & Peterson

[57] ABSTRACT

Displacement washing of slurry body is provided in a centrifuge filter (peeler centrifuge) by introducing wash liquid along the inner surface of the drum while the drum is rotating. The wash liquid moves through the filter into the slurry body in a broad front to displace the mother liquor of the slurry body toward the axis of rotation of the drum. The mother liquor is removed by an overflow pipe or dip tube to a point outside the centrifuge filter for disposal.

5 Claims, 2 Drawing Sheets

PROCESS OF DISPLACEMENT WASHING IN A CENTRIFUGE FILTER

FIELD OF THE INVENTION

The present invention is directed to a process for achieving improved displacement washing in a centrifuge filter (peeler centrifuge).

BACKGROUND OF THE INVENTION

A standard drum centrifuge has a housing in which a foraminous drum is rotated at high speed about its axis. In starch manufacture, a suspension is fed to the interior of the drum so that it is thrown centrifugally against the wall thereof. At first the suspension forms an annular body in the drum having an inner surface centered on the axis, then this annular body stratifies and the liquid phase passes through the drum while the solid phase stays behind on the inner surface of the drum as a filter cake. The inner layer of liquid passes radially outward, under the influence of centrifugal force, through the layer of solids until the cake is substantially dry. As a rule, the drum is filled and refilled in a number of cycles until the filter cake builds up to a desired depth. This cake is then rinsed or washed by introducing wash liquid into contact with the internal surface of the cake so that the wash liquid passes radially outward through the cake under continued centrifugation until the cake is once more substantially dry. In some cases, a hot gas can be passed through it to further dry it, and finally it is physically stripped out of the drum and the cycle is restarted.

The co-current washing procedure described above has the disadvantage that, due to the well-compacted cake condition produced, the wash liquid moves through the cake very slowly, thus prolonging the time consumed in the wash process. It is also true that channeling of the wash may occur in the cake as a result of cake cracking; this leading to low washing efficiency by virtue of poor distribution of wash liquid in the cake. Further, this form of washing tends to increase compaction of both fine and large particles in the cake.

In the case of starch washing, this means that the fine protein (gluten) particles are retained in the cake with the larger starch particles, whereas it would be desirable to separate these particles and remove the gluten to obtain purified starch.

It is clear that there are problems in washing cake or slurry bodies produced by centrifugation which require attention and demand improvement.

The centrifuge filter (peeler centrifuge) is the subject of prior U.S. patents including U.S. Pat. No. 5,066,271, issued Nov. 19, 1991, and U.S. Pat. No. 5,091,084, issued Feb. 25, 1992 which disclose various aspects of this technology.

SUMMARY OF THE INVENTION

This is a process for displacement washing in a centrifuge filter (peeler centrifuge); the centrifuge filter having a structure which includes a cylindrical drum rotatable about and centered on an axis and having an outer wall, a supported filter mesh lying on the inner surface of the drum, inlet feed means for introducing a slurry feed into the drum, a reservoir rotatable with the drum for filtrate and wash liquids, wash inlet means for introducing liquid into the drum reservoir for displacement washing and back-flushing the filter mesh and an overflow wash outlet.

An effective displacement washing procedure is countercurrent or backwashing in which a large volume of wash liquid is introduced from the periphery of the drum and moves radially inward toward the rotational axis of the drum. At this washing stage, the feed of slurry is preferably in progress, so that while a thin layer of cake is being deposited, the state of the slurry body, on the whole, may best be described as loosely compacted. Under these conditions, a large volume of wash liquid can pass through the thin cake layer and slurry body very quickly and displacement wash the liquid phase or mother liquor off the cake layer. The solid particles of the slurry may also be subjected to a classification action by this procedure, with lighter fine solid particles lifted by and flowing with the wash liquid, while heavier solid particles travel outward against the flow of wash liquid. In this way a separation or classification can be effected between light and heavy solid particles.

In the process, the slurry feed is introduced into the drum through the inlet feed means and the drum is rotated at a moderate velocity. While the feed is being introduced, the displacement wash liquid is introduced into the wash reservoir, which is in fluid communication with the slurry body in the drum, in an amount which tends to exceed the depth of the slurry body. Under the centrifugal force generated by the rotating drum, the wash liquid in the reservoir and the slurry in the drum approach a common level, with wash liquid flowing between the inner surface of the drum and the filter mesh and then through the filter mesh into the incipient cake layer and the slurry body. The wash liquid passes into the cake/slurry body in a wide front displacing the mother liquor before it, while centrifugal force urges most solid particles in the slurry through the wash liquid toward the filter mesh. As the wash liquid enters the slurry body, the overflow wash outlet is moved into contact with the internal surface of the slurry body which, at the point of contact, is composed largely of mother liquor and fine solids. The overflow wash outlet is scoop-shaped where it contacts the slurry body and the rotation of the slurry body with the drum centripetally forces the mother liquor into the scoop portion and through the wash outlet thereby exiting the drum for disposal or further treatment. Soluble protein and a certain amount of fine protein solids leave the drum with the mother liquor effecting purification and some classification.

DETAILED DESCRIPTION OF THE INVENTION

Figure 1:
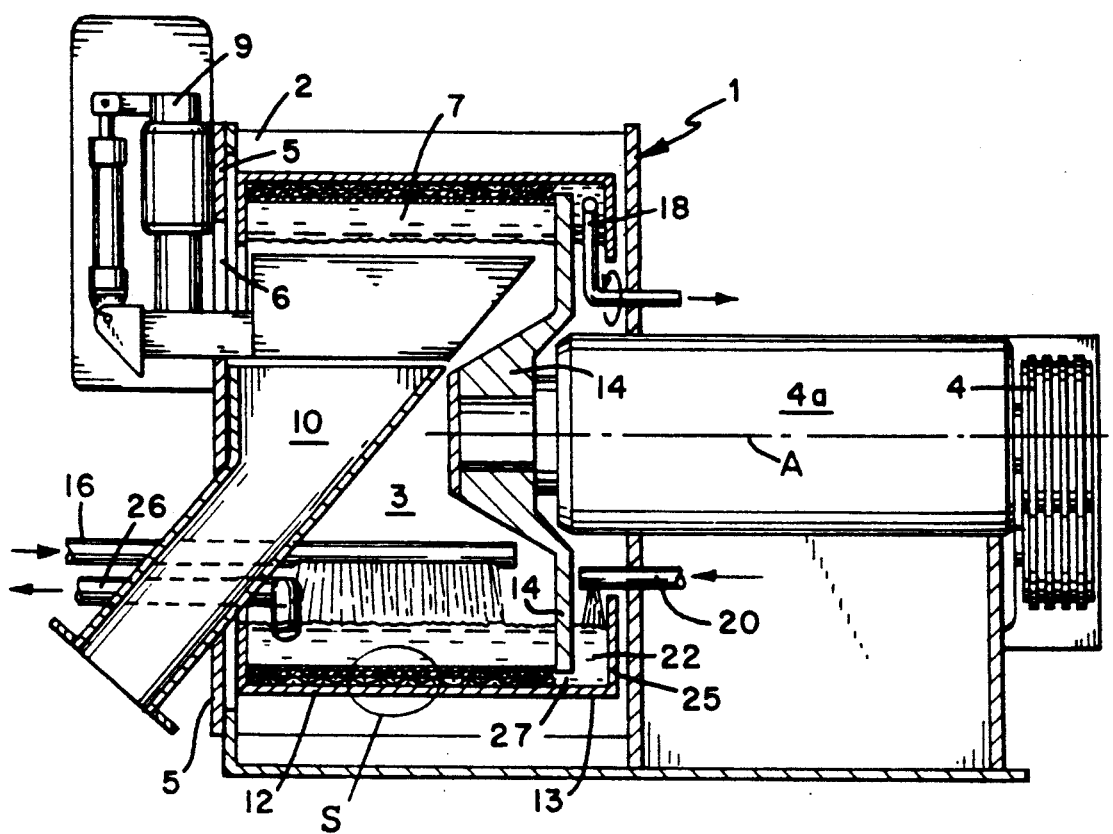
FIG. 1 is a view in section of a centrifuge filter in which displacement washing can be conducted.

As seen in FIG. 1 a drum filter centrifuge or peeler centrifuge 1 has a normally stationary housing 2 in which a drum 3 is rotatable about horizontal axis A. A drive 4 is connected via a shaft 4a to an end wall 14 of the drum to rotate it. The opposite end of the drum 3 is closed by a wall 5 pierced by one or more holes through which extend a chute or conduit 10 for carrying away solids, a pipe 16 for introducing into drum 3 a suspension to be separated into a liquid filtrate phase and a solid phase and a wash outlet or overflow conduit 26. The wall 5 also has a hole 6 through which extends a solids scraper 8 that can be moved vertically by an actuator 9 to scrape filter cake 7 and drop that material into the upper end of the conduit 10.

Figure 2:
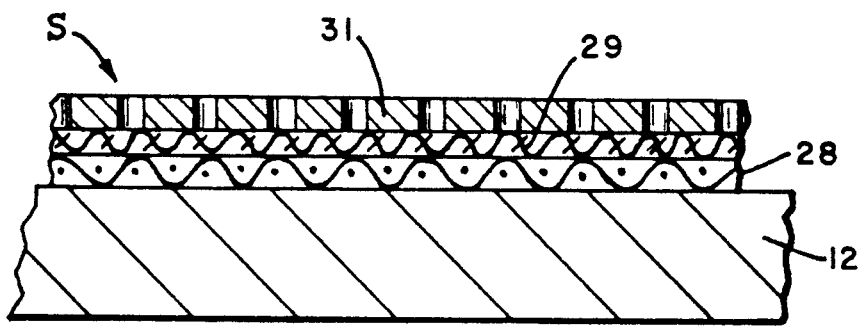
FIG. 2 is a sectional view of the filter mesh and associated structure.

In FIG. 1 it will be seen that the drum 3 has a cylindrical side wall 12 centered on the axis A which extends beyond the rear end wall 14 in a portion 13 which joins a radially inwardly directed partition 25 to form a wash reservoir 22. Internally the drum 3 is provided, as seen in enlarged section S in FIG. 2, with a cylindrical mesh 28 supporting a filter cloth 29 and a retainer member 31 contacting the inner surface of filter cloth 29. A passage 27 connects chamber 22 for flow of wash liquid from chamber 22 into the region adjacent side wall 12 in which the mesh 28 and the filter cloth 29 are positioned. A dip tube 18, for drawing liquid filtrate from chamber 22 is radially displaceable in chamber 22 between a radially inner position for establishing a high liquid level in the chamber 22 and a radially outer position establishing a shallower liquid level.

Figure 3:
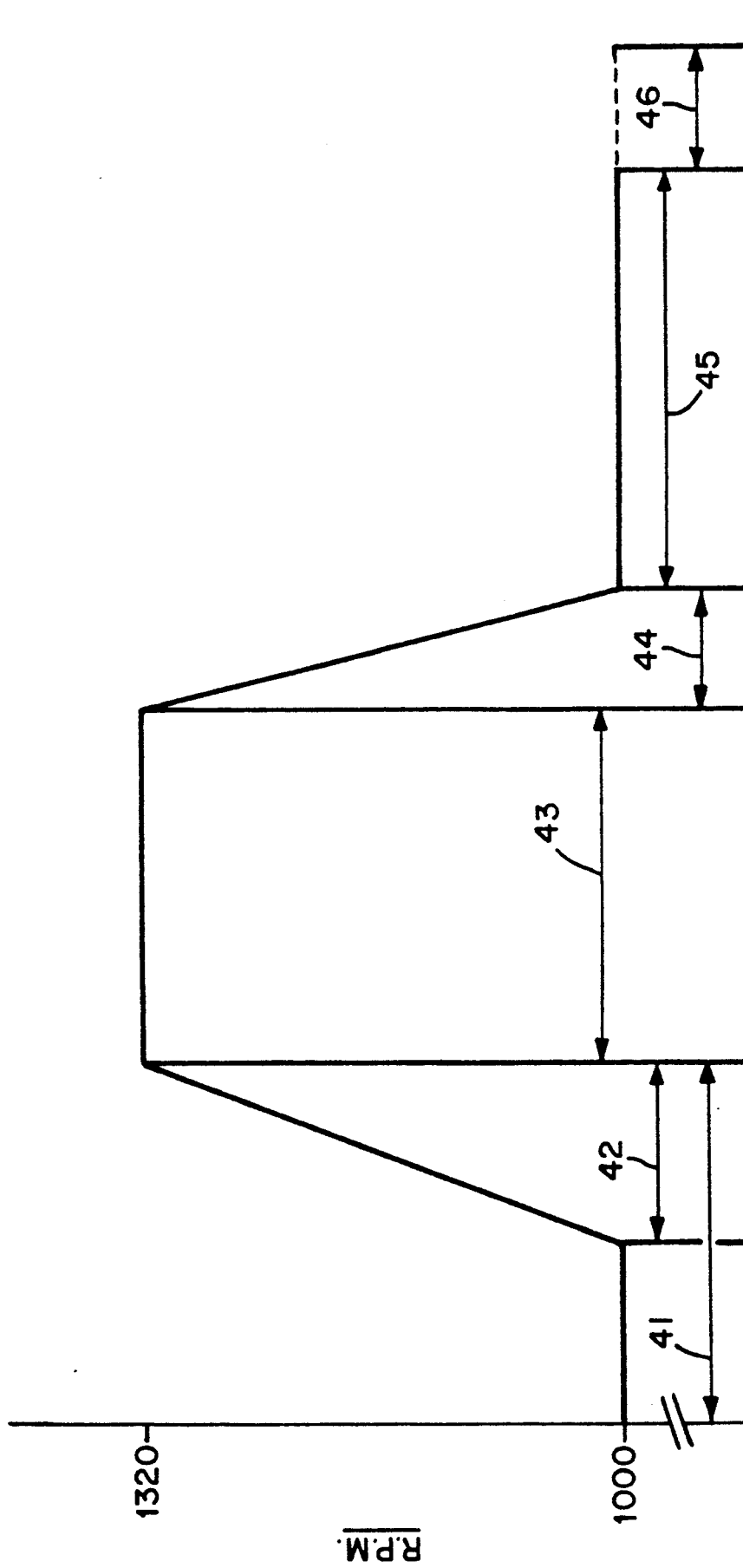
FIG. 3 is a diagram of typical operating cycle of a centrifuge filter in which rpm of the centrifuge is plotted against time.

Referring to FIG. 3, a typical operating cycle of the filter centrifuge in starch manufacture is diagrammed. FIG. 3 is specific to operation of the Buckau-Wolf Model 1250H peeler centrifuge, manufactured by and available from Dorr-Oliver Deutschland, Grevenbroich, Germany. In this diagram the vertical axis represents the rpm of the centrifuge and the horizontal axis represents time. The feed of slurry into the centrifuge is conducted for a time period 41 of perhaps 60 seconds. Simultaneously, displacement washing is carried out. During the first 30 seconds or so of feed time the centrifuge is operated at 1000±5% rpm to initiate cake deposition. Over the following 30 seconds of feed time 42, the centrifuge is accelerated to a rotational velocity of 1320±5% while displacement washing continues.

At this velocity, which is maintained for a period 43 of perhaps 60 to 180 seconds, the slurry is well separated into a solids fraction deposited as cake on the cylindrical filter of the drum and a liquid fraction which passes through the cylindrical filter. The filtrate is removed from the filter centrifuge through filtrate outlet 18 during this high speed run. The centrifuge is then decelerated over a time period 44 of perhaps 20 seconds to a velocity of 1000±5% rpm. In the time period 45 of perhaps 90 seconds the cake is discharged from the filter centrifuge. At this point in the cycle, it is possible to back-flush the filter mesh over the time period 46 to clean out the mesh pores, but it should be understood that this cleaning procedure for the filter mesh will not be necessary every cycle and will be practiced with a frequency based upon experience with the operating conditions at a particular site.

It will be understood that FIG. 3 represents an exemplary operation of a centrifuge filter having a rotatable drum or basket of 1250 mm diameter. Smaller and larger basket models of the centrifuge filter are available. In the case of smaller baskets, the centrifuge filters operate at higher rotational velocities and produce results similar to those obtained in the example given in FIG. 3. Larger diameter baskets may be operated at somewhat lower velocities. With respect to these centrifuge filters of larger or smaller diameter baskets, some adjustment of the time required to carry out each stage of the process may also be required.

Referring once more to FIG. 1, the displacement washing procedure of the invention begins while the slurry feed to the drum 3 is in progress. With the drum 3 rotating at a moderate velocity and the slurry 7 consequently subjected to centrifugal force, wash liquid is introduced through conduit 20 to the reservoir 22. As the wash liquid in the reservoir 22 (also subject to centrifugal force) tends to rise above the level of slurry 7, wash liquid flows through passage 27 along the interior of cylindrical wall 12 and up through the filter mesh 29 and incipient cake layer in a broad front displacing the liquid phase or mother liquor of the slurry which passes through the outlet conduit or pipe 26 for further treatment or disposal externally of the filter centrifuge 1.

It will be understood that while the process has been described for practice in the field of starch manufacture, it will be applicable in other manufacturing operations. For example, in the recausticizing system for pulping operations. Further, as described above, the washing operation is preferably carried out simultaneously with the feeding operation. However, the wash operation may be conducted immediately after the feed operation is completed, although the additional thickness of the cake layer deposited is likely to slow the wash process.

It is a reasonable expectation that, in practicing the present invention, from 70% to 90% of the liquid phase or mother liquor of a slurry will be replaced at a wash rate of one pound of washing medium per pound of mother liquor.

There has thus been described a process for displacement washing of slurry in a centrifuge filter (peeler centrifuge).

We claim:

1. A process for displacement washing of slurry present in the drum of a centrifuge filter, said slurry comprising particulate solids suspended in a liquid phase or mother liquor, said drum having a rotational axis, a reservoir chamber co-axial and rotatable with said drum for containing wash liquid, filter means within said drum, said reservoir chamber having flow connection with the slurry in said drum through said filter means, the steps of the process comprising, rotating the centrifuge filter so that the slurry in said drum is held against the filter means by centrifugal force as an annular body having an outer surface contacting the filter means and an inner surface spaced from the rotational axis of the drum, the rotation of the centrifuge filter producing incipient cake formation, passing wash liquid from said reservoir chamber through said filter means and the slurry body thereby displacing said liquid phase through said slurry body toward said rotational axis of said drum and removing said displaced liquid phase from said drum without traversing said filter means.

2. The process of claim 1 wherein said liquid phase or mother liquor is removed by a dip tube operating within said drum to intersect the inner surface of the slurry body and transport the liquid phase through a connecting conduit to a point outside the centrifuge drum.

3. The process of claim 2 wherein wash liquid is added to said reservoir chamber to bring about passage of wash liquid into said drum under the influence of centrifugal force to thereby establish a common level of liquid in said drum and said reservoir chamber.

4. A displacement washing process effective in a centrifuge filter (peeler centrifuge), said centrifuge filter including:

a) a generally hollow cylindrical drum rotatable about and centered on an axis with the wall of said drum having an inner and an outer surface;
b) a reservoir chamber co-axial and rotatable with said drum;
c) a supported cylindrical filter mesh lying on said inner surface;
d) slurry feed means for introducing a slurry into the interior of said cylindrical drum, said slurry comprising particulate solids and a liquid phase or mother liquor;
e) inlet means for introducing wash liquid into said reservoir chamber;
f) an overflow pipe extending into said drum; the washing process being carried out while a feed slurry is introduced into the cylindrical drum and the drum is rotating at a velocity assuring establishment of substantial centrifuge forces, the process comprising, passing a wash liquid from said reservoir chamber into said drum along said inner surface, the wash liquid traversing said cylindrical filter mesh radially inwardly into contact with an incipient cake layer and said slurry to displace the liquid phase of said slurry, said liquid phase exiting said drum through said overflow pipe.

5. A process for displacement washing of slurry present in the drum of a centrifuge filter to provide a washed filter cake product, said slurry comprising both light and heavy particulate solids suspended in a liquid phase or mother liquor, said drum having a rotational axis, a reservoir chamber co-axial and rotatable with said drum for containing wash liquid, filter means within said drum, said reservoir chamber having flow connection with the slurry in said drum through said filter means, the steps of the process comprising rotating the centrifuge filter so that the slurry in said drum is held against said filter means by centrifugal force as an annular body having an outer surface spaced from the rotational axis of the drum, passing said wash liquid from said reservoir chamber through said filter means and said slurry body to displace said liquid phase and entrained light particulates through said slurry body toward said rotational axis of said drum, removing said displaced liquid phase and entrained light particulates from said drum without traversing or engaging said filter means, rotating the centrifuge filter at a higher rotational velocity to form a compacted filter cake including said heavy particulates on said filter means while separating the liquid associated with said filter cake by driving it through said filter means under centrifugal force, and harvesting the washed filter cake as product.

* * * * *